United States Patent [19]

Wittensoldner et al.

[11] Patent Number: 5,144,114

[45] Date of Patent: Sep. 1, 1992

[54] VOLUME CONTROL APPARATUS

[75] Inventors: Christopher J. Wittensoldner; Denis M. Blanford, both of Cambridge, Ohio

[73] Assignee: NCR Corporation, Dayton, Ohio

[21] Appl. No.: 408,193

[22] Filed: Sep. 15, 1989

[51] Int. Cl.[5] .......................... H03G 3/00; G06K 7/10
[52] U.S. Cl. .................................. 235/375; 235/462; 381/104; 381/105
[58] Field of Search ............... 381/104, 105, 107, 109, 381/106; 364/405; 235/375, 376, 377, 462; 330/129, 285, 279

[56] References Cited

U.S. PATENT DOCUMENTS

| | | | |
|---|---|---|---|
| 4,222,069 | 9/1980 | Groetschel | 235/375 X |
| 4,253,018 | 2/1981 | Amacher et al. | 235/463 |
| 4,272,675 | 6/1981 | Blanford et al. | 235/463 |
| 4,275,380 | 6/1981 | Gardner et al. | 340/146.32 |
| 4,282,426 | 8/1981 | Neseem et al. | 235/463 |
| 4,287,507 | 9/1981 | Janes | 340/146.32 |
| 4,369,334 | 1/1983 | Nakatani et al. | 179/1 SM |
| 4,509,129 | 4/1985 | Yatsunami et al. | 364/513.5 |
| 4,614,144 | 9/1986 | Sagara et al. | 235/375 |
| 4,625,240 | 11/1986 | Yablonski et al. | 381/104 X |
| 4,679,154 | 7/1987 | Blanford | 364/525 |
| 4,694,725 | 9/1987 | Seevers et al. | 84/1.27 |
| 4,794,343 | 12/1988 | Yang | 330/129 X |
| 4,797,932 | 1/1989 | Rohulich et al. | 381/104 |
| 4,868,375 | 9/1989 | Blanford . | |
| 4,873,493 | 10/1989 | Fujiwara | 330/285 |

OTHER PUBLICATIONS

Scamteam 1100/1200-Programming Menu Apr. 1989.

Primary Examiner—Stuart S. Levy
Assistant Examiner—Joseph A. Rhoa
Attorney, Agent, or Firm—Albert L. Sessler, Jr.

[57] ABSTRACT

A bar code reader has the capability of reading a bar code symbol containing information for causing change in the volume of a speaker associated with said reader, as well as reading merchandise identification symbols commonly associated with items such as merchandise being checked out at a point of sale terminal. The apparatus for controlling the volume of the speaker includes a microprocessor, a digital-to-analog converter, an AC coupler, a reference amplifier, a peak-to-peak amplifier and a push-pull driver.

24 Claims, 7 Drawing Sheets

VOLUME CONTROL APPARATUS

BACKGROUND OF THE INVENTION

This invention relates to apparatus for controlling the volume of a speaker, and more particularly relates to such an apparatus in which control of the volume of a speaker is achieved by use of a bar code.

The use of symbols or labels which comprise bar codes as a means for identifying data which is used in processing items sold in the retail industry, and for other purposes as well, has been widely accepted. A particular bar code, known as the Universal Product Code (UPC), has been established as the industry standard for the grocery and other related retail industries. In a multiple bar code, such as the UPC, each decimal number or character is represented by two pairs of vertical bars and spaces within a seven-bit pattern wherein a binary one bit is represented by a dark module or bar of a predetermined width and a binary zero is represented by a light module or space. Thus, for example, the decimal or character one may be represented in the UPC code by the seven-bit pattern 0011001. In keeping with the format, the decimal one would be comprised of an initial space of a two-bit width, followed by a two-bit wide bar, another two-bit space and a one-bit wide bar. For each character or decimal value of the system, there are two bars and two spaces which have a total width of seven modules or bits. The width of each of the bars or spaces which comprise a character may be one, two, three or four modules wide, so long as the sum of the bars and spaces is seven bits or modules wide.

In present day merchandise checkout systems, the use of optical scanners or readers for scanning the UPC labels on purchased merchandise items has become quite common. In the checkout systems in use today, the optical reader can take the form of a reader mechanism located in a checkout counter, or the form of a hand-held wand. In either case, the optical reader will scan the bar code pattern that forms the UPC label, and will generate signals representing the bars and spaces of the pattern for transmission to a processor which determines the character represented by the bar code pattern. The character which identifies the purchased items is then transmitted to an associated data terminal device and from there to a remote or back office processor which looks up the price of the item in a table located in the processor. The price is then transmitted back through the terminal device, where the price is printed on a receipt by a printer mechanism located in the terminal device, and then to a customer display member located adjacent to the checkout counter where the price of the item is displayed. If an error occurs due to a malfunction of the printer or if the price of the item is not listed in the price-lookup table, error signals are generated, notifying the operator to take appropriate actions to correct the situation.

Means are customarily provided for altering error signals and other signals generated by the reader, and for altering other functions of the reader. One method for altering reader functions which employs the use of bar codes is found in U.S. Pat. application Serial No. 234,666, filed Aug. 22, 1988, inventor Denis M. Blanford, U.S. Pat. No. 4,868,375, issued Sept. 19, 1989, assigned to the assignee of the present application.

Among the functions which it may be desirable to alter is the volume of sound produced by a speaker associated with a scanner, which provides an audible signal indicating that an acceptable scanning operation has been performed on the symbol being scanned. For example, one reason for altering the sound volume would be a change in ambient noise conditions in the establishment in which the scanner is being used.

Various means have been employed in the past to change the volume of speakers in business machines. One such system is shown in U.S. Pat. No. 4,694,725, issued Sep. 22, 1987, inventors Daniel B. Seevers and John J. Rohulich, assigned to the assignee of the present application. A second such system is shown in U.S. Pat. No. 4,797,932, issued Jan. 10, 1989, inventors John J. Rohulich and John B. Keys, also assigned to the assignee of the present application.

SUMMARY OF THE INVENTION

In the present invention, a scanning system includes apparatus for recognizing a predetermined bar code arrangement and for employing a signal generated by recognition of that bar code arrangement for controlling apparatus to produce a change in the sound volume of a speaker.

In accordance with one embodiment of the irvention, volume control apparatus for controlling the volume of a speaker from scanned coded indicia comprises: processor means for receiving digital information representing scanned coded data and for distinguishing coded indicia bearing a code relating to a change in speaker volume from other coded indicia and capable for producing a tone signal, a data signal and a clock signal in response to receiving digital information representing a change in speaker volume; digital-to-analog converter means coupled to said processor means for receiving said data signal and said clock signal from said processor means and generating a reference level signal in response thereto; coupler means coupled to said processor means for receiving said tone signal therefrom and generating a first AC signal in response thereto; first amplifier means coupled to said digital-to-analog converter means and to said coupler means for generating a second AC signal related in waveform to said first AC signal and related in amplitude to said reference level signal; driver means coupled to said first amplifier means to provide a speaker drive signal; and speaker means coupled to said driver means to be driven by the speaker drive signal.

It is accordingly an object of the present invention to provide a simple, effective apparatus for controlling the volume of a speaker.

Another object is to provide an apparatus for controlling the volume of a speaker by sensing a bar code.

With these and other objects, which will become apparent from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIGS. 4, 4A, 4B and 4C constitute circuit diagrams of elements for operating the speaker, and FIG. 4 shows the manner in which FIGS. 4A, 4B and 4C should be assembled.

DESCRIPTION OF THE PREFERRED EMBODIMENT

Figure 1:
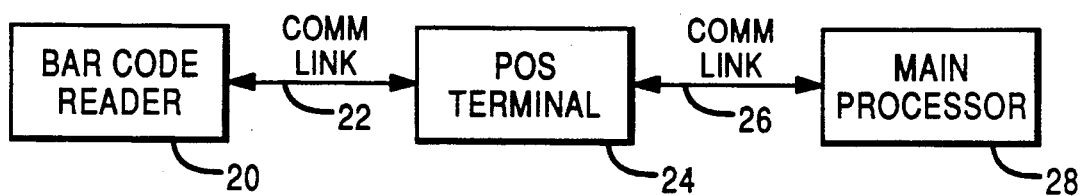
FIG. 1 is a block diagram of a system including a bar code reader, a point of sale terminal and a main processor.

Referring now to FIG. 1, there is shown a block diagram of a checkout system which may embody the present invention. This system includes a bar code reader 20 for scanning a coded label on a purchased merchandise item and for generating coded signals representing the identity of the purchased item. These signals are transmitted over a communications link 22 to a terminal device 24, shown here as a point of sale terminal, which in turn transmits the signals over a further communications link 26 to a main processor 28. The processor 28, utilizing the signals received, determines the price of the purchased item from a price look-up table stored in the processor 28. The numerical data representing the price is transmitted over the communications link 26 to the terminal device 24 which prints the price on a receipt. The data may also be transmitted over the communications link 22 to the reader 20 which actuates a customer display to display the price of the item purchased to the customer. The bar code reader is not limited to use in merchandise systems, as it may be used in a wide variety of other applications, such as the checking in and out of library books and other materials, for example.

Figure 2:
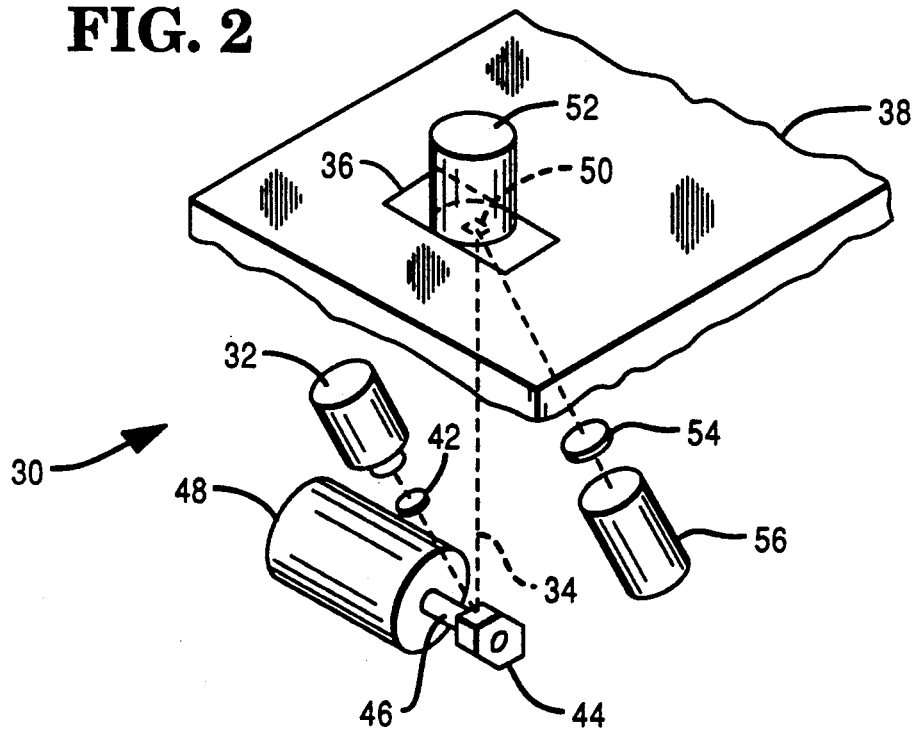
FIG. 2 is a fragmentary perspective view of the mechanical elements of a bar code reader.

Referring now to FIG. 2, there is shown a perspective view of the mechanical structure of the bar code reader 20 which includes a scanner assembly generally indicated by the numeral 30, comprising a light source 32 emitting an optical scanning light beam 34 in the visible or near visible spectrum, the light beam being directed through an aperture 36 located in a supporting surface 38 of a checkout counter 40. The light source 32 may be a HeNe gas discharge laser that is pumped to produce a continuous laser beam of red monochromatic light of approximately 6,328 angstrom wave length.

Figure 7:
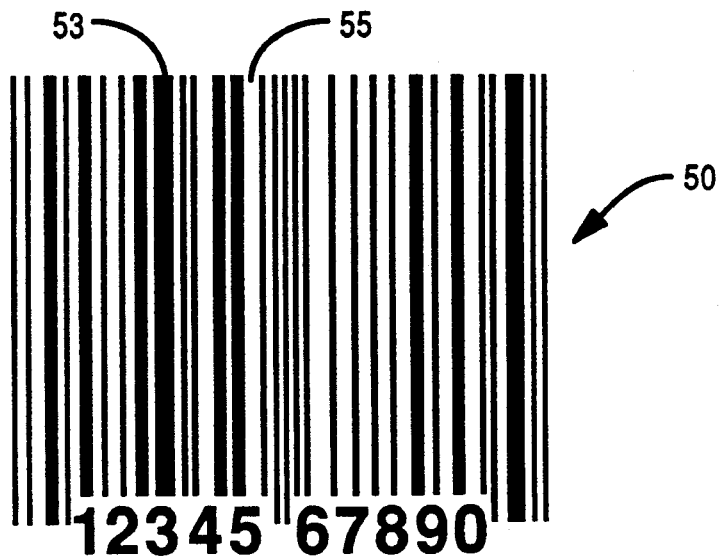
FIG. 7 is a representation of a UPC data symbol.

In a manner that is well-known in the art, the light beam 34 produced by the source 32 may be focused by a lens system 42 onto a multi-faced mirror 44. The mirror 44 is mounted on the shaft 46 of a motor 48 which rotates the mirror 44 at a substantially constant speed. The mirror 44 is positioned to intercept the light beam 34 and projects the same through the aperture 36 to scan the encoded indicia on a label 50 fixed to a merchandise item 52. As shown, for example, in the typical UPC symbol appearing in FIG. 7, the encoded data on the label 50 comprises a plurality of black coded areas 53 and white coded areas 55 representing data. The rotation of the mirror 44 causes a succession of light beams 34 to scan any encoded label 50 positioned over the aperture 36.

The light beam is reflected off the label 50 through an optica filter 54 to a photo-responsive pick-up device such as a photo-multiplier 56 which converts the reflected light beam into electrical signals, the amplitude of which correspond to the amounts of light received. Thus, the amplitude of the light reflected from the white coded areas 55 on the label 50 (FIG. 6) will be greater than the light reflected from the black coded areas 53. Conventional amplifying circuits will produce a relatively high voltage which can be assigned a binary one value when the beam 34 is scanning a black coded area 53 on the label and a relatively low voltage which can be assigned a binary zero value when the beam 34 is scanning a white coded area 55. Thus, the information contained on the label 50 can be decoded and used as an input to a processor for use in generating the price of the purchased item 52.

Figure 3:
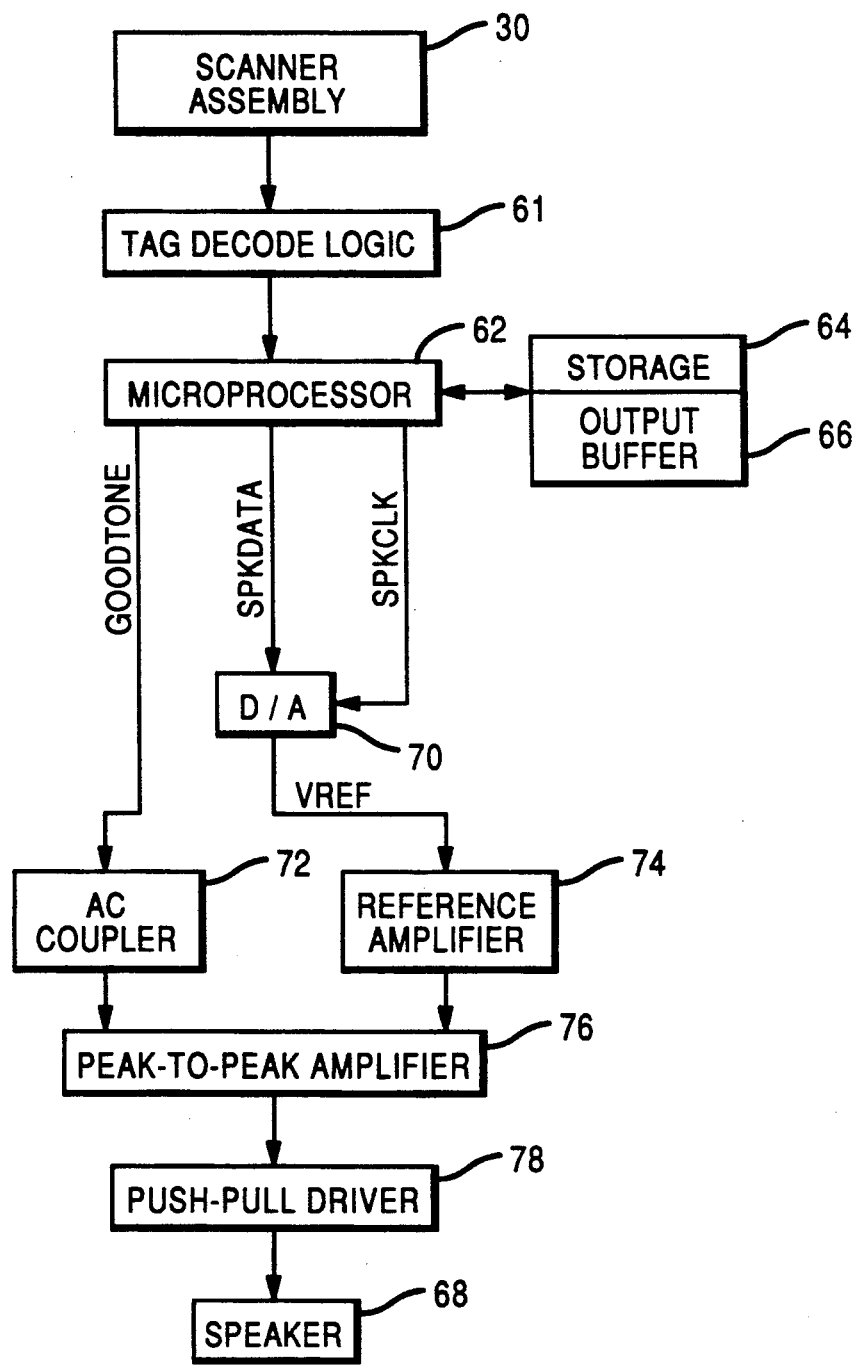
FIG. 3 is a block diagram of certain elements of a bar code reader, particularly showing the speaker and operating elements therefor.

Referring now to FIG. 3, shown there is a partial block diagram of the bar code reader 20. The reader 20 includes the scanner assembly 30, tag decode logic 61, a microprocessor 62, a conventional memory storage unit 64, an output buffer unit 66 for transmitting the data read by the scanner assembly 30 over the communication link 22 to a processor unit (not shown) in the POS terminal 24, a tone generator or speaker 68 and light indicators (not shown). The tag decode logic 61 and the microprocessor 62 are customarily embodied in separate chips which may be mounted on the same circuit board. An eight-bit data bus carries decoded data from the decode logic 61 to the microprocessor 62.

When the scanner assembly 30 reads a label 50 on a merchandise item 52 which is positioned adjacent the aperture 36, the serial data read is transmitted to the tag decode logic 61. The tag decode logic 61 will decode the received serial data, will frame said decoded logic into half-tag segments, and will transmit the half-tag segments to the microprocessor 62, which will assemble the half tag segments into full tags in accordance with the different parity checks which are used in the first and second half-tag segments, will determine if the tag data is valid or not, will then generate control signals indicating a good or a bad read, and will transmit such signals to the tone generator or speaker 68 and to the light indicators to cause said tone generator 68 and said light indicators in the bar code reader 20 to be operated to provide appropriate indication to the operator of the terminal.

For a more detailed description of the bar code reader 20 and the bar code which is read, reference may be had to the following U.S. Pat. Nos., which are assigned to the assignee of the present application: 4,253,018, issued Feb. 24, 1981; 4,272,675, issued Jun. 9, 1981; 4,275,380, issued Jun. 23, 1981; 4,282,426, issued Aug. 4, 1981; 4,287,507, issued Sep. 1, 1981; and 4,679,154, issued Jul. 7, 1987.

As has been previously stated, in the present invention, the bar code reader 20 may also be used to read bar code labels which do not contain merchandise identification information, but instead contain information which is effective to change the sound volume of the speaker 68. It will be seen that the entry of speaker volume altering information or commands into the reader 20 by means of a scanning operation rather than by making mechanical or electrical changes in the system or by reprogramming the reader 20 provides substantial advantages from the standpoint of time required and simplicity.

The blocks located below the microprocessor 62 in FIG. 3 represent elements which are unique to the volume control apparatus of the present invention. These include a digital-to-analog converter 70, an AC coupler 72, a reference amplifier 74, a peak-to-peak amplifier 76, and a push-pull driver 78, as well as the speaker 68. The microprocessor 62 is coupled to the digital-to-analog converter 70, and provides a data signal SPKDATA and a clock signal SPKCLK thereto. The microprocessor 62 is also coupled to the AC coupler 72, and applies a signal GOODTONE thereto. The digital-to-analog converter 70 generates a signal VREF in response to the signals SPKDATA and SPKCLK, and applies it to the reference amplifier 74, to which it is coupled. Both the AC coupler 72 and the reference amplifier 74 are coupled to the peak-to-peak amplifier 76, and apply signals thereto. In response, the peak-to-peak amplifier 76 applies a signal to the push-pull driver 78, to which it is coupled, and the push-pull driver 78 applies a driver signal to the speaker 68, to which it is coupled.

Figure 4A:
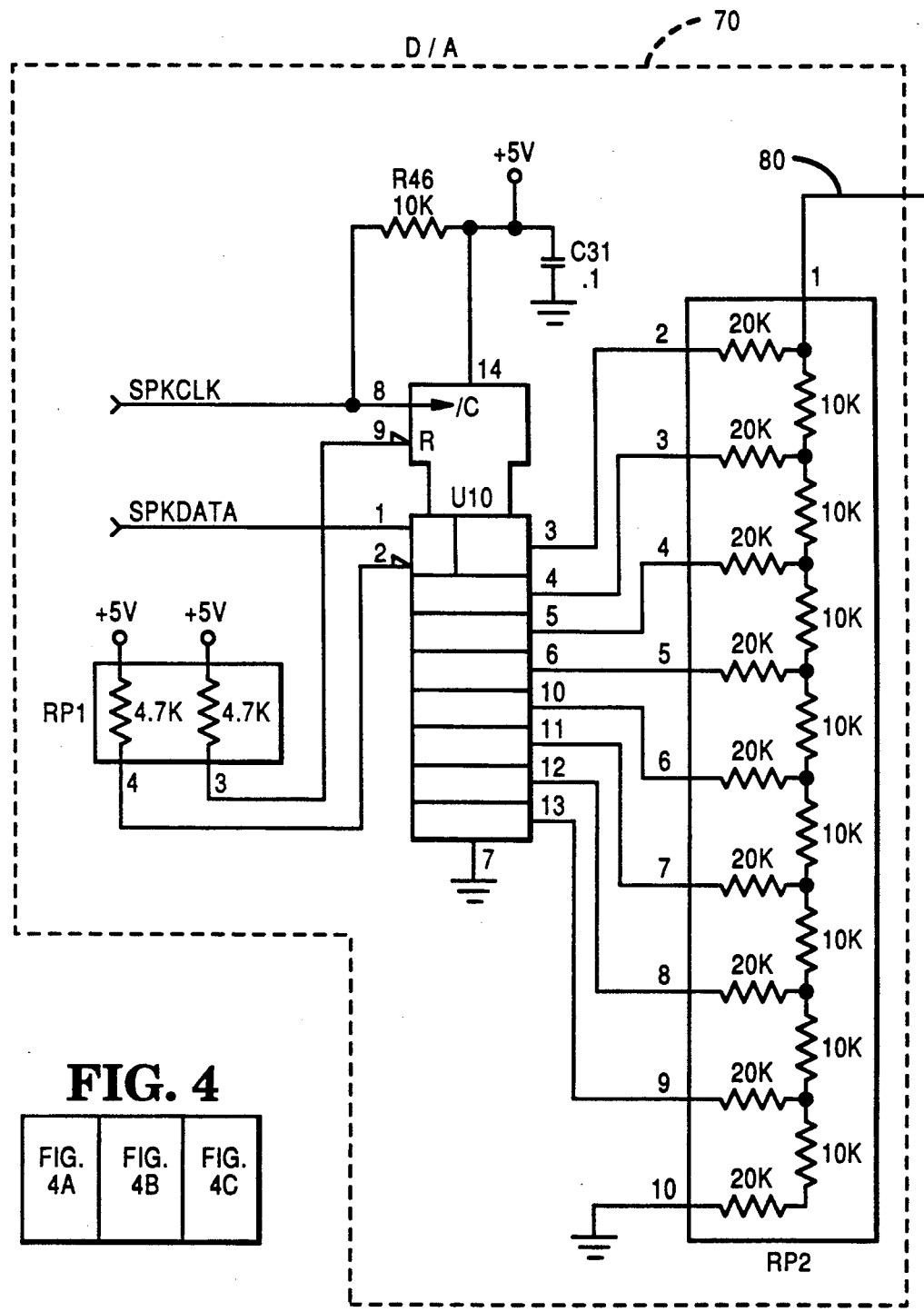
Figure 4A:
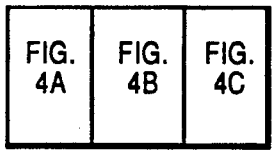
Figure 4B:
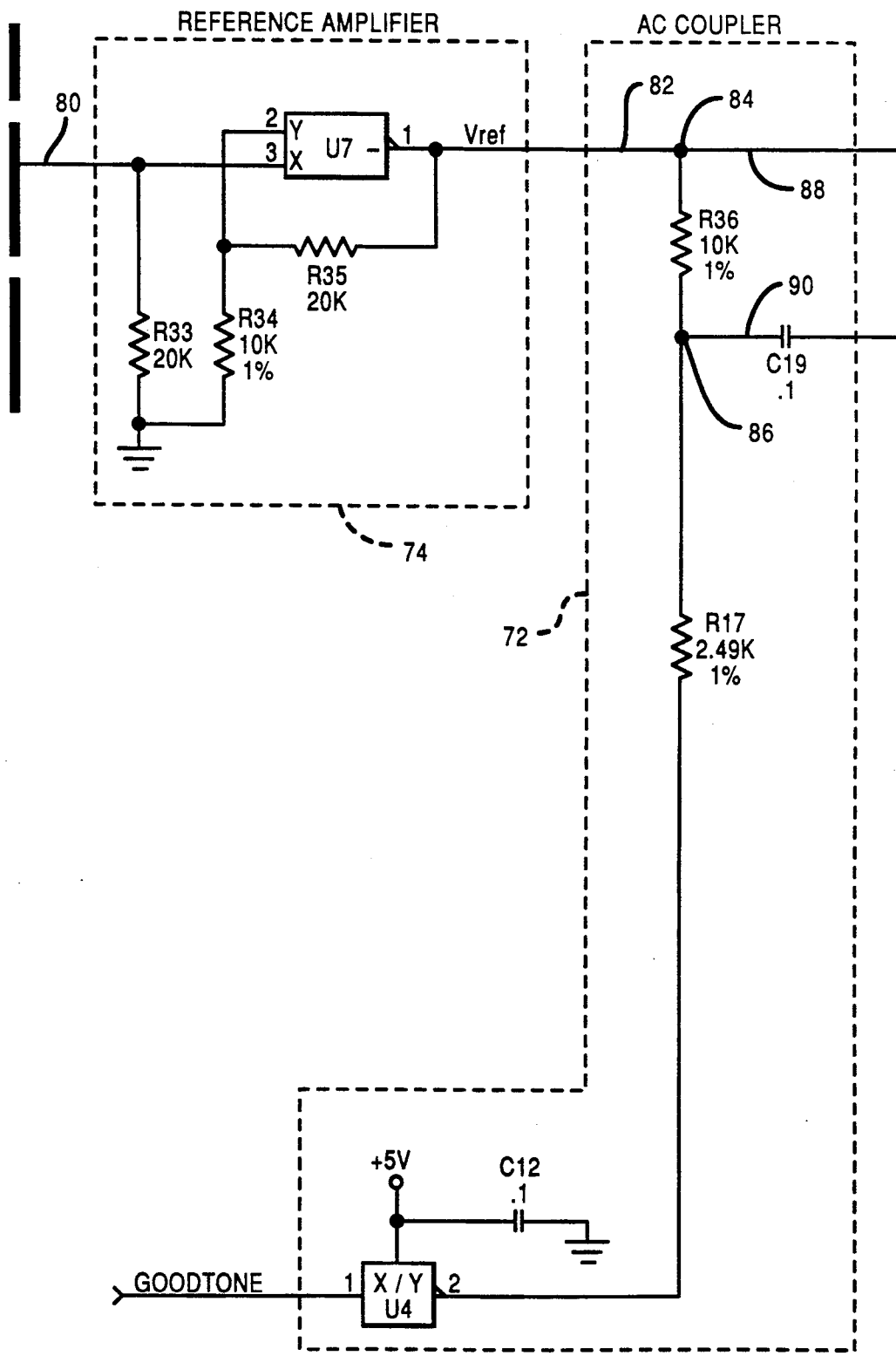
Figure 4C:
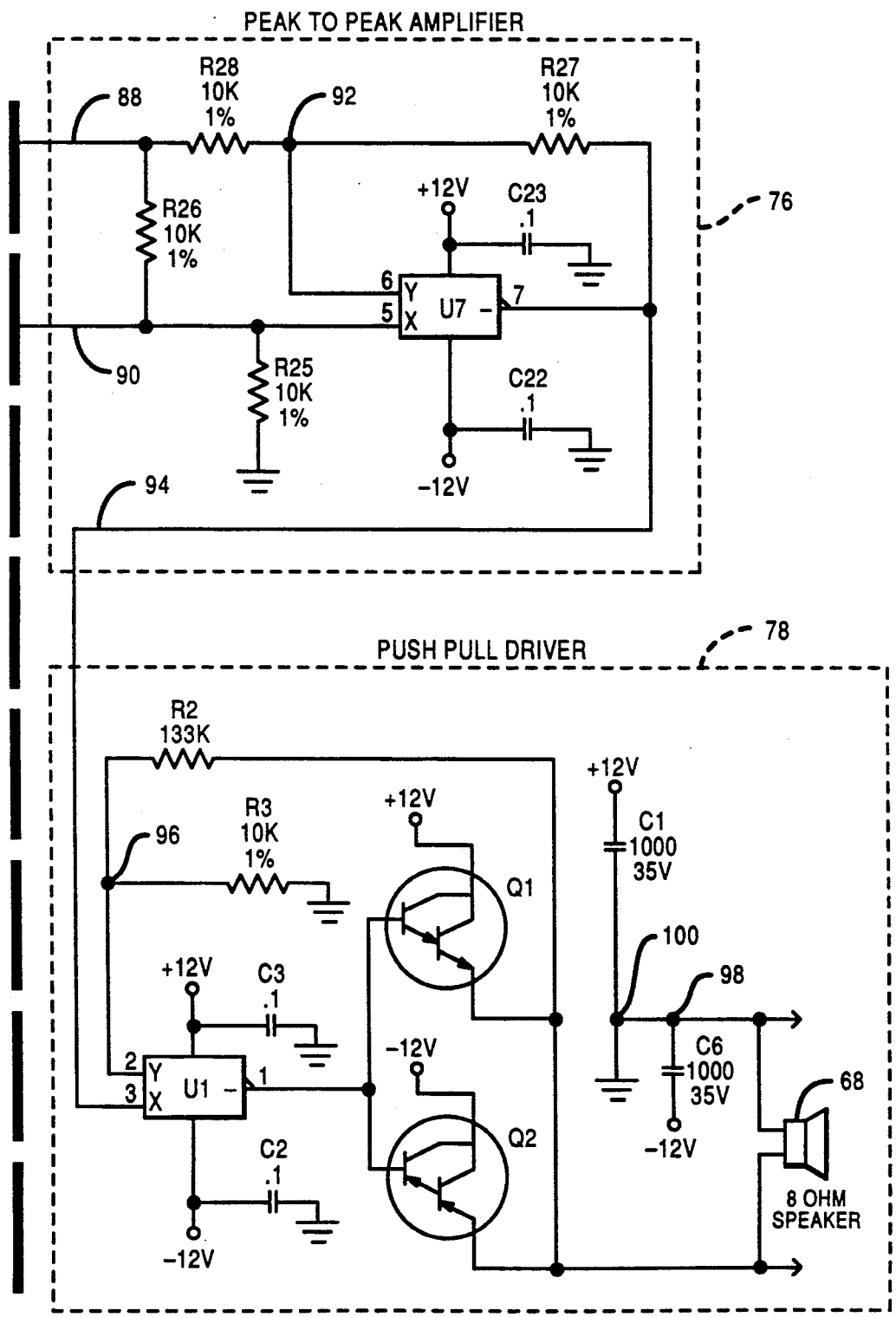

The relationship among the elements 70, 72, 74, 76, 78 and 68 of FIG. 3 is shown in greater detail in the circuit diagram of FIGS. 4A, 4B and 4C.

Referring to FIG. 4A, the digital-to-analog converter 70 is shown within a dashed-line block, and includes a serial-in parallel-out shift register U10, which may be of type 74LS164, manufactured by Texas Instruments, Dallas, Texas. Any eight bit serial-in parallel-out register could be used. The data signal. SPKDATA from the microprocessor 62 is applied to the pin 1 input of the register U10 and is clocked in by the clock signal SPKCLK from the microprocessor 62, as applied to the clock input of said register. The clock input is also connected through a 10K-ohm resistor R46 to an input terminal 14 of the register U10, to a source of +5-volt potential, and over a 0.1 microfarad capacitor C31 to ground. Inputs 2 and 9 of the register U10 are connected to +5-volt sources of potential through 4.7K-ohm resistors shown embodied in a device RP1. Outputs 3, 4, 5, 6, 10, 11, 12 and 13 of the register U10 are connected to a resistance network embodied in a device RP2 which includes a 20K-ohm resistor connected to each of the above-mentioned register outputs, plus an additional 20K-ohm resistor connected to ground. Each adjacent pair of 20K-ohm resistors is connected by a 10K-ohm resistor, and a conductor 80 appearing at terminal 1 of the device RP2 is connected to one end of the resistor network. The device RP2 could be replaced with a group of appropriately connected resistors, if desired.

As shown in FIG. 4B, the conductor 80 is connected to the reference amplifier 74, and specifically to ground through a 20K-ohm resistor R33 and to one input of an operational amplifier U7 which may be of type TL082, manufactured by Motorola Semiconductor Products, Phoenix, Arizona. The second input of the amplifier U7 is connected to ground through a 10K-ohm resistor R34, and to the output of the amplifier U7 through a 20K-ohm resistor R35. The resistors R34 and R35 and the amplifier U7 form a noninverting operational amplifier with a gain of three. Any operational amplifier with proper input and output impedances could be used. All resistors are 1%. The output of the amplifier U7 continues as a conductor 82 to the AC coupler 72, shown within a dashed-line block, and more specifically to a node 84. The signal GOODTONE from the microprocessor 62 is applied to one terminal of an open collector buffer driver U4, which has another terminal connected to a +5-volt source of potential and to ground over a 0.1-microfarad capacitor C12. The output of the buffer driver U4 is connected through a 2.49K-ohm resistor R17, a node 86, and a 10K-ohm resistor R36 to the node 84.

Conductors 88 and 90 extend from the nodes 84 and 86, respectively, to the peak-to-peak amplifier 76, with the conductor 90 extending over a 0.1-microfarad capacitor C19. The peak-to-peak amplifier 76 is shown in FIG. 4C within a dashed-line block. A 10K-ohm resistor R25 connects the conductor 90 to ground, and a 10K-ohm resistor R26 connects the conductor 90 to the conductor 88. The conductor 90 is connected to one input of an operational amplifier U7. The conductor 88 is connected through a node 92 and a 10K-ohm resistor R28 to the other input of the operational amplifier U7. The node 92 is connected through a 10K-ohm resistor R27 to the output of the amplifier U7. Additional terminals of the amplifier U7 are connected to +12-volt and −12-volt sources of potential, respectively, and to ground over 0.1-microfarad capacitors C23 and C22, respectively. The resistors R25, R26, R27 and R28, and the amplifier U7 form a differential amplifier with a gain of one. The input from the capacitor C19 is a signal that is peak-to-peak from ground to Vref whose midpoint is half Vref. The output of the differential amplifier is a signal with the same peak-to-peak value but riding on midpoint at ground, and extends over a conductor 94 to the push-pull driver 78, shown within a dashed line block in FIG. 4C.

More specifically, the conductor 94 is connected to one input of an amplifier U1, which may be of type TL082. A second input of the amplifier U1 is connected to ground through a node 96 and a 10K-ohm resistor R3. Additional terminals of the amplifier U1 are connected to +12-volt and −12-volt sources of potential, respectively, and to ground over 0.1-microfarad capacitors C3 and C2, respectively. The output terminal of the amplifier U1 is connected to the bases of two matched complementary power transistors Q1 and Q2, Q1 being an NPN transistor and Q2 being a PNP transistor. The collectors of both of these transistors are connected to a source of +12-volt potential. The emitters of both of these transistors are connected to the node 96 through a 133K-ohm resistor R2, and are also connected to one side of the speaker 68. The other side of the speaker 68 is connected through a node 98 and over a 100-microfarad capacitor C6 to a −12-volt source of potential, and is also connected through a node 100 to ground and over a 1000-microfarad capacitor C1 to a +12-volt source of potential. In the push-pull driver 78, the resistors R2 and R3 and the amplifier U1 form a non-inverting amplifier with a gain of 14.3. The output of the amplifier U1 drives a class A amplifier comprising the transistors Q1 and Q2. The output of Q1 and Q2 drives the speaker, which is shown here as an 8-ohm speaker, with one side grounded. All resistors are 1%. The amplifier U1 could be any operational amplifier that can provide the current to drive the transistors Q1 and Q2.

Figure 6:
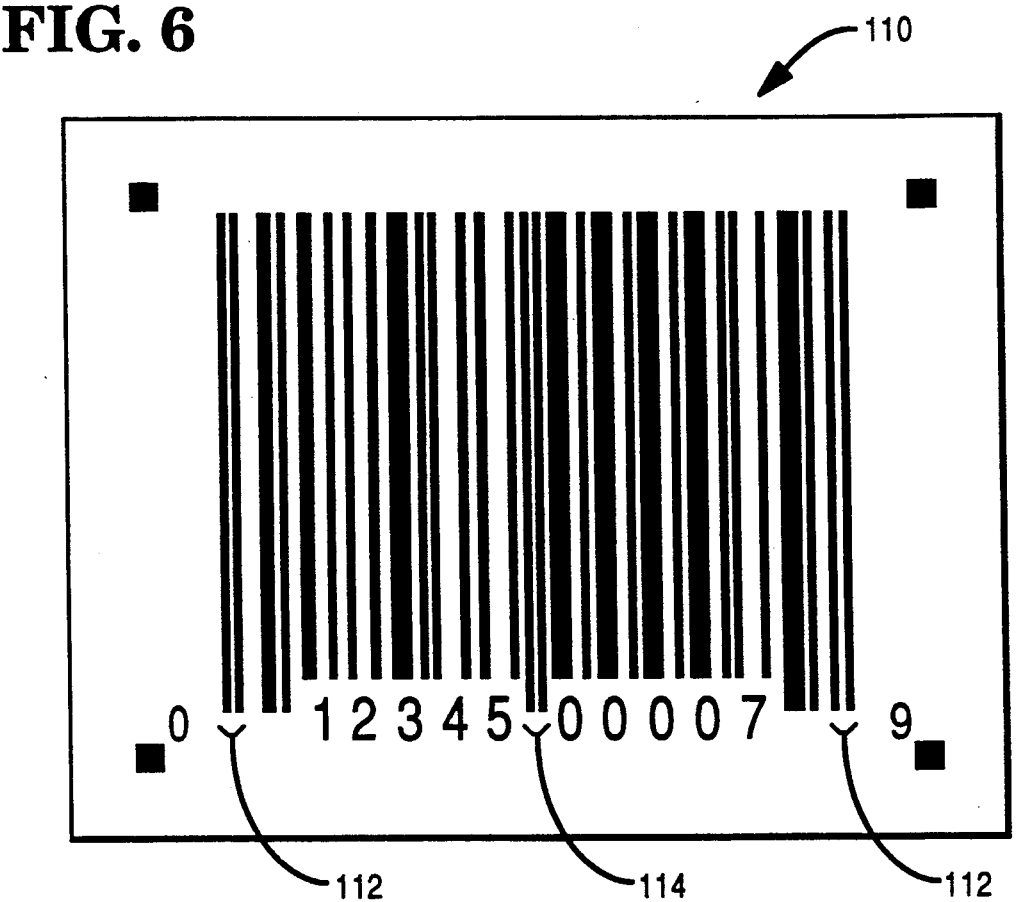
FIG. 6 is a representation of a bar code symbol which is used for changing the volume of a speaker.

Shown in FIG. 6 is a bar code label 110 which may be used to perform the function of changing the volume of a speaker associated with the bar code reader 20. Examination of this label and comparison of it with the merchandise identification label 50 of FIG. 6, will disclose certain common features, and certain areas of difference. For example, both the label 110 and the merchandise identification label 50 have a guard bar 112 comprising two narrow dark bars with an intervening light space at both the left and right margins of the label. Both have a number system character comprising a light space and a relatively wide dark bar at the left side of the label inward from the left guard bar. Both have two five-digit character groupings with a center band pattern or center bar 114 positioned therebetween. In the examples, the left character grouping comprises the same five characters (1 2 3 4 5) for all seven labels, although this would usually not be the case.

The difference between the volume changing label 110 on the one hand and the merchandise identification label 50 on the other hand, which enables the bar code reader 20 to distinguish between function labels and merchandise identification labels, resides in the character immediately to the left of the right-hand guard bar in all of these labels. In the merchandise identification label 50, this is a modulo check character, which is calculated in accordance with the other data characters included in the label to produce a check digit so that a mathematical operation involving all of the characters sensed from the label, including the check character, will always produce a final result having a certain characteristic. For example, the Universal Product Code employs a modulo 10 check for merchandise identification labels.

The volume changing label 110, on the other hand, is designed in terms of its character values so that it will not pass a modulo 10 check. In this label, the character immediately to the left of the right-hand guard bar, in the same relative position as the module check character of the merchandise identification label, is used as part of the data which determines the particular function to be performed. In the label illustrated in FIG. 6, this character is a 9. It is used in connection with the character 7, to its immediate left, to operate the speaker volume changing function.

The bar code reader 20 can store the function setting in a non-volatile memory, such as a battery-backed random access memory or an electrically erasable or programmable read only memory, in order to allow removal of power from the reader 20 while still maintaining the correct function settings.

Figure 5:
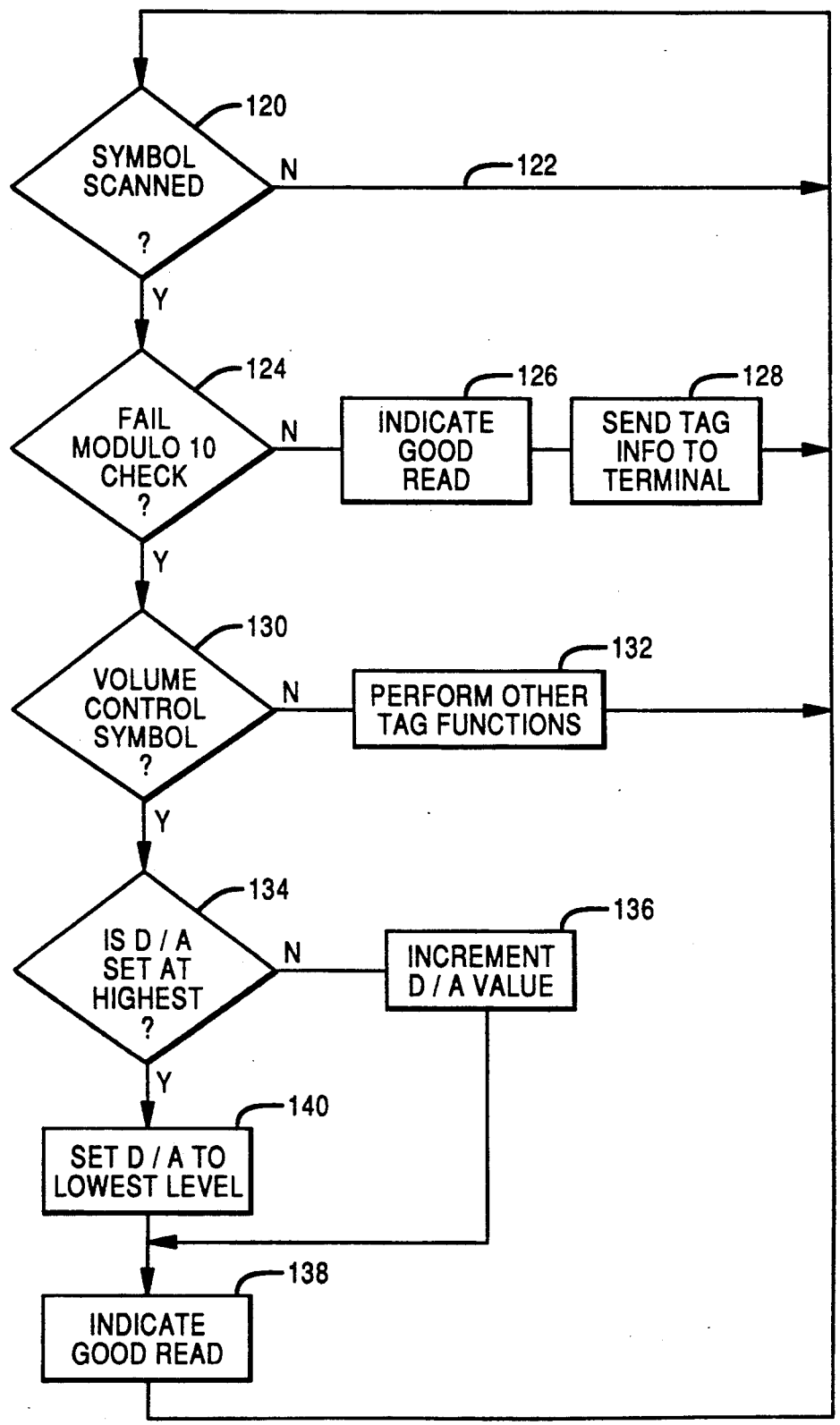
FIG. 5 is a flow diagram, showing the process by which speaker volume may be changed.

Shown in FIG. 5 is a flow diagram representing the process through which the speaker volume of the bar code reader may be changed by scanning a function label such as that shown in FIG. 6.

Commencing with the start of the operation, which is represented by block 120, the volume changing symbol of FIG. 6 is sensed by the scanning assembly 30 of the bar code reader 20, and a determination is made, as also represented by block 120, by means of the decode logic 61 and the microprocessor 62, as to whether or not a UPC symbol has been read, using criteria based upon UPC code standards. If not, the process returns to the block 120, via the path 122.

Assuming that the reader 20 determines that a UPC symbol has been read, the reader 20 then examines the data scanned from the label which was read and determines whether the symbol passes a modulo 10 check and is therefore a legitimate merchandise identification symbol, as represented in block 104. If so, the reader 20 provides to the operator an indication that a good symbol reading has taken place, as represented by the block 126, the data representing the symbol is sent to the terminal 24, as represented in block 128, and the process returns to the block 120.

If the symbol does not pass the mod 10 check in block 124, the process continues to block 130, in which a determination is made as to whether or not the symbol being read is a volume control symbol, using criteria based upon the unique identification characteristics of the volume control code described above. If the symbol is not a volume control code, then it presumably pertains to other functions, such as are the subject of the previously referred to patent application Serial No. 234,666, and the scanner is accordingly directed to perform other tag functions, as represented by block 132.

If the symbol being read is determined to be a proper volume control symbol, the process continues, as represented in block 134. The microprocessor 62 outputs the volume control signals GOODTONE and SPKDATA, as well as the clock signal SPKCLK. A determination is made by the microprocessor 62 as to whether the digital-to-analog converter is set to its highest value. If not, then the value of the digital-to-analog converter 70 is incremented each time that the symbol is sensed, as represented by the block 136, which will produce an incremental increase in the volume of the sound emitted by the speaker 68, and a good read indication is provided, as represented by the block 138. If the digital-to-analog converter is already set to its maximum value, then said converter is reset to its lowest value, as represented by the block 140. Subsequent scannings of the volume control tag can then incrementally increase the speaker volume to the level desired.

The desired eight-bit value is loaded serially into the digital-to-analog converter 70 by the microprocessor 62 using the SPKDATA line as the data and the SPKCLK line as the clock for the shift register U10 (FIG. 4A). A good read is indicated and the process returns to look for the next tag. When the processor desires to generate a tone, the GOODTONE line is toggled at the frequency desired. As set forth in the previously-mentioned application Ser. No. 234,666 now U.S. Pat. No. 4,868,375, the desired frequency may be altered by use of another function bar code.

While the form of the invention illustrated and described herein is particularly adapted to fulfill the objects aforesaid, it is to be understood that other and further modifications within the scope of the following claims may be made without departing from the spirit of the invention.

What is claimed is:

1. Volume control apparatus for controlling the volume of a speaker, comprising:

optical scanning means for scanning visible coded indicia, and producing scanning signals representative thereof;

logic decode means coupled to said scanning means for providing digital information representative of said coded indicia from said scanning signals;

processor means coupled to said logic decode means, for distinguishing coded indicia bearing a code relating to a change in speaker volume from other coded indicia and for producing a tone signal, a data signal and a clock signal in response to receiving of digital information representing a change in speaker volume from said logic decode means;

digital-to-analog converter means coupled to said processor means for receiving said data signal and said clock signal from said processor means and generating a reference level signal in response thereto;

AC coupler means coupled to said processor means for receiving said tone signal therefrom and generating a first AC signal in response thereto;

peak-to-peak amplifier means coupled to said digital-to-analog converter means and to said AC coupler means for generating a second AC signal related in waveform to said first signal and related in amplitude to said reference level signal;

push-pull driver means coupled to said peak-to-peak amplifier means to provide a speaker drive signal; and speaker means coupled to said push-pull driver means to be driven by the speaker drive signal.

2. The volume control apparatus of claim 1, in which said coded indicia comprises a bar code.

3. The volume control apparatus of claim 2, in which said bar code includes a right-hand guard bar, and in which a bar code which is used for changing speaker volume includes a first character located immediately to the left of said right-hand guard bar for distinguishing the volume control code from a merchandise code.

4. The volume control apparatus of claim 3, in which said bar code includes a second character located immediately to the left of said first character, said first and second characters being used to control the volume of the speaker.

5. The volume control apparatus of claim 2, in which said bar code comprises a UPC code.

6. The volume control apparatus of claim 1, in which said digital-to-analog converter means comprises a parallel-output shift register coupled to a resistor network.

7. The volume control apparatus of claim 1, also including reference amplifier means coupled to said digital-to-analog converter means and to said peak-to-peak amplifier means to amplify the reference-level signal before it is applied to said peak-to-peak amplifier means.

8. The volume control apparatus of claim 7, in which said reference amplifier means comprises a non-inverting operational amplifier.

9. The volume control apparatus of claim 1, in which said AC coupler means comprises an open collector buffer driver.

10. The volume control apparatus of claim 1, in which said push-pull driver means comprises a noninverting operational amplifier coupled to a Class A amplifier.

11. The volume control apparatus of claim 8, in which said Class A amplifier comprises a matched complementary pair of power transistors.

12. The volume control apparatus of claim 11, in which said matched complementary pair of power transistors includes a PNP transistor and an NPN transistor.

13. The volume control apparatus of claim 1, in which said peak-to-peak amplifier means comprises an operational amplifier and resistor means coupled thereto.

14. Volume control apparatus for controlling the volume of a speaker from scanned coded indicia, comprising:

processor means for receiving digital information representing scanned coded indicia and for distinguishing coded indicia bearing a code relating to a change in speaker volume from other coded indicia and for producing a tone signal, a data signal and a clock signal in response to receiving digital information representing a change in speaker volume;

digital-to-analog converter means coupled to said processor means for receiving said data signal and said clock signal from said processor means and generating a reference level signal in response thereto;

coupler means coupled to said processor means for receiving said tone signal therefrom and generating a first AC signal in response thereto;

first amplifier means coupled to said digital-to-analog converter means and to said coupler means for generating a second AC signal related in waveform to said first AC signal and related in amplitude to said reference level signal;

driver means coupled to said first amplifier means to provide a speaker drive signal; and speaker means coupled to said driver means to be driven by the speaker drive signal.

15. The volume control apparatus of claim 14, in which said coded indicia comprises a bar code.

16. The volume control apparatus of claim 15, in which said bar code comprises a UPC code.

17. The volume control apparatus of claim 14, in which said digital-to-analog converter means comprises u parallel-output shift register coupled to a resistor network.

18. The volume control apparatus of claim 14, also including reference amplifier means coupled to said digital-to-analog converter means and to said first amplifier means to amplify the reference-level signal before it is applied to said first amplifier means.

19. The volume control apparatus of claim 18, in which said reference amplifier means comprises a non-inverting operational amplifier.

20. The volume control apparatus of claim 19, in which said coupler means is an AC coupler means and comprises an open collector buffer driver.

21. The volume control apparatus of claim 14, in which said driver means comprises a noninverting operational amplifier coupled to a Class A amplifier.

22. The volume control apparatus of claim 21, in which said Class A amplifier comprises a matched complementary pair of power transistors.

23. The volume control apparatus of claim 22, in which said matched complementary pair of power transistors includes a PNP transistor and an NPN transistor.

24. The volume control apparatus of claim 14, in which said first amplifier means comprises an operational amplifier and resistor means coupled thereto.

* * * * *